(12) United States Patent
Jun et al.

(10) Patent No.: US 8,005,080 B2
(45) Date of Patent: Aug. 23, 2011

(54) IPV6 ADDRESS CONFIGURATION METHOD IN WIRELESS MOBILE NETWORK AND APPARATUS THEREFOR

(75) Inventors: Sun-Mi Jun, Daejeon (KR); Nam-Suk Lee, Daejeon (KR); Kyung-Soo Kim, Daejeon (KR)

(73) Assignees: Electronics and Telecommunications Research Institute, Daejeon (KR); Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 11/873,152

(22) Filed: Oct. 16, 2007

(65) Prior Publication Data
US 2008/0095154 A1    Apr. 24, 2008

(30) Foreign Application Priority Data

Oct. 23, 2006  (KR) .................. 10-2006-0102900
Mar. 14, 2007  (KR) .................. 10-2007-0024936

(51) Int. Cl.
*H04L 12/28* (2006.01)
(52) U.S. Cl. .................. 370/389; 370/329; 709/222
(58) Field of Classification Search .................. None
See application file for complete search history.

(56) References Cited

U.S. PATENT DOCUMENTS

| | | | |
|---|---|---|---|
| 2002/0147820 A1* | 10/2002 | Yokote .................. | 709/229 |
| 2004/0083362 A1* | 4/2004 | Park et al. .................. | 713/162 |
| 2005/0018677 A1 | 1/2005 | Lee et al. | |
| 2005/0265360 A1 | 12/2005 | Kim et al. | |
| 2006/0227747 A1* | 10/2006 | Kim et al. .................. | 370/331 |
| 2007/0047550 A1* | 3/2007 | Takayama .................. | 370/392 |
| 2007/0064653 A1 | 3/2007 | Jang et al. | |
| 2007/0260884 A1* | 11/2007 | Venkitaraman et al. ....... | 713/169 |
| 2008/0137622 A1* | 6/2008 | Russell .................. | 370/338 |
| 2008/0244090 A1* | 10/2008 | Zhu et al. .................. | 709/242 |

FOREIGN PATENT DOCUMENTS

KR    10-2005-0012187 A    1/2005

(Continued)

OTHER PUBLICATIONS

Thomson et al., IPv6 Stateless Address Autoconfiguration, Dec. 1998, p. 1 and 7.*

*Primary Examiner* — Daniel J Ryman
*Assistant Examiner* — Tito Pham
(74) *Attorney, Agent, or Firm* — Jefferson IP Law, LLP

(57) ABSTRACT

An IPv6 address configuration method for a terminal in a wireless mobile network and an apparatus therefor are provided. In the wireless mobile network, an Internet Protocol version 6 (IPv6) address configuration apparatus is provided to a router (access control router; ACR) or a base station (radio access station; RAS). In the address configuration apparatus, a MAC access procedure is performed to extract information required for IPv6 address allocation procedure, and the address is configured by using available fields of a message. In addition, a duplicate address detector (DAD) in which the terminal directly takes part is omitted by using information on the router (ACR) or the base station (RAS). In addition, during the IPv6 address configuration procedure, in order to prevent messages of IPv6 from being transmitted in a wireless region, an agent for address configuration is provided to the terminal. The router (ACR) acquires information required for the address configuration by using a portion of fields of MAC management messages. Accordingly, in the wireless mobile network, it is possible to reduce a time taken for an initial access procedure in which an IPv6 address is allocated to the terminal and to reduce consumption of wireless resource.

13 Claims, 7 Drawing Sheets

FOREIGN PATENT DOCUMENTS

| | | |
|---|---|---|
| KR | 1020060066580 A | 5/2006 |
| KR | 1020060038690 A | 6/2006 |
| KR | 10-2006-0082039 A | 7/2006 |
| KR | 100735265 B1 | 7/2007 |
| KR | 100739286 B1 | 7/2007 |

* cited by examiner

FIG.3

| Name | Size | Description | | | |
|---|---|---|---|---|---|
| Management Message Type | 8 bits | 11 | | | |
| Transaction ID | 16 bits | Unique identifier for this transaction assigned by the sender. | | | |
| | | Type | Length | Value | |
| Service Flow { | | UL:145 DL:146 | | | |
| ... | | | | | |
| CS parameter Encoding Rules | | | | STORE ADDRESS ALLOCATED TO TERMINAL IN PACKET CLASSIFICATION RULE -> IP DESTINATION ADDRESS AND TRANSMITS ADDRESS | |
| ... | | | | | |

IPV6 ADDRESS CONFIGURATION METHOD IN WIRELESS MOBILE NETWORK AND APPARATUS THEREFOR

CROSS-REFERENCE TO RELATED APPLICATION

This application claims priority to and the benefit of Korean Patent Application No. 10-2006-0102900 and 10-2007-0024936 respectively filed in the Korean Intellectual Property Office on Oct. 23, 2006 and Mar. 14, 2007, the entire contents of which are incorporated herein by reference.

BACKGROUND OF THE INVENTION (a) Field of the Invention

The present invention relates to an address configuration method, and more particularly, to an Internet Protocol (IP) address configuration method for a terminal in a wireless mobile network environment and an apparatus therefor.

(b) Description of the Related Art

In general, the Internet Protocol version 4 (Ipv4) has a 32-bit address system. However, as the Internet has become more widely used, allocatable addresses have been exhausted. In order to solve this problem, the IETF (Internet Engineering Task Force) prepared the next-generation standard, that is, the Internet Protocol version 6 (Ipv6) having a 128-bit address system.

In the IPv6, there is proposed an address auto-configuration mechanism where an IP address is automatically allocated to a terminal through interaction between the terminal and a network. The address auto-configuration mechanism is classified into a statefull address auto-configuration mechanism where a server manages and allocates an IP address and a stateless address auto-configuration mechanism where a terminal directly generates an IP address and uses the IP address after a server checks address conflict.

In the stateless address auto-configuration mechanism, the terminal generates a 128-bit address by using 64-bit prefix information provided by the network and a 64-bit interface ID generated by the terminal. The prefix information is a unique value that the network side provides to the terminal. The interface ID is a value (a 64-bit unique interface ID) that is generated by using a 48-bit media access control (MAC) address included in a communication network interface card of the terminal in accordance with the EUI-64 ID generating scheme (Internet Protocol version 6 (Ipv6) Addressing Architecture IETF RFC 2373) or a value that is generated at random. An address conflict verification procedure that is performed to verify uniqueness of the generated address is called a duplicate address detection (DAD) procedure. In the DAD procedure, the terminal attaches the generated address to a neighbor solicitation (NS) message and transmits the address together with the message to the network. If a response is not received in a predetermined time interval, the IP address of the terminal is determined to be verified, so that the IP address can be used. However, if the address is already being used by another terminal, the terminal transmits a neighbor advertisement (NA) message as a response. The terminal that receives the NA message generates a different address and again performs the aforementioned DAD procedure. In such an IP address configuration procedure, when address conflict occurs, the aforementioned procedures are repeatedly performed, so that bandwidth, which is an important factor of the wireless network, is wastefully consumed. Particularly, a delay involved in the address configuration deteriorates a quality of real-time traffic and a performance of transmission and reception.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an IPv6 address auto-configuration method and apparatus having advantages of being capable of reducing the number of message exchanging procedures required for an initial access procedure of a wireless network, reducing a time taken for access, and reducing consumption of wireless resource.

An exemplary embodiment of the present invention provides an address configuration method in which a router configures an IP address of a terminal in a wireless mobile network, the method including: extracting a MAC address from a field of a MAC management message requesting initial registration received from the terminal; generating an interface address of the terminal by using the MAC address; generating the IP address of the terminal by attaching a network prefix of the router to the interface address of the terminal; and transmitting the generated IP address to the terminal.

In addition, generating the interface address of the terminal may include performing duplicate address detection (DAD) so as to verify uniqueness of the interface address of the terminal.

Another embodiment of the present invention provides an address configuration method in which a terminal configures an IP address in a wireless mobile network, the method including: transmitting a message requesting initial registration to a MAC layer, wherein the message includes a MAC address of the terminal; extracting information required for address auto-configuration from a MAC management message received from a router, wherein the information is generated based on a MAC address of the terminal; performing auto-configuration of the IP address by using the extracted information; and transmitting a resulting information message to the router.

Yet another embodiment of the present invention provides an IP address configuration apparatus for a router in a wireless mobile network, the apparatus including: a terminal MAC address extractor that extracts a MAC address of the terminal; a terminal network address generator that generates an interface address of the terminal based on the extracted MAC address of the terminal; and a message generator that generates a MAC management message including an IP address that is configured based on the interface address of the terminal and the network prefix of the router and transmits the MAC management message to the terminal.

In addition, the address configuration apparatus for the router may further include a DAD unit that verifies uniqueness of the generated interface address of the terminal.

Still another embodiment of the present invention provides an IP address configuration apparatus for a terminal, the apparatus including: a transmitting/receiving processing unit that processes transmitting/receiving messages between the terminal and a router; a message analyzer that attaches a MAC address to a message requesting initial access to the router; an address auto-configuration agent that acquires an IP address of the terminal that is generated based on the MAC address included in the message received from the router and generates a response message required for the IP address configuration to transmit the response message to an IP protocol; and a message generator that generates a message that the terminal completing an address auto-configuration procedure is to notify to the router.

BRIEF DESCRIPTION OF THE DRAWINGS

FIG. 3 is a view illustrating a provisioned dynamic service addition request (DSA_REQ) message of which an option field is attached with a network address according to an exemplary embodiment of the present invention.

DETAILED DESCRIPTION OF THE EMBODIMENTS

Figure 1:
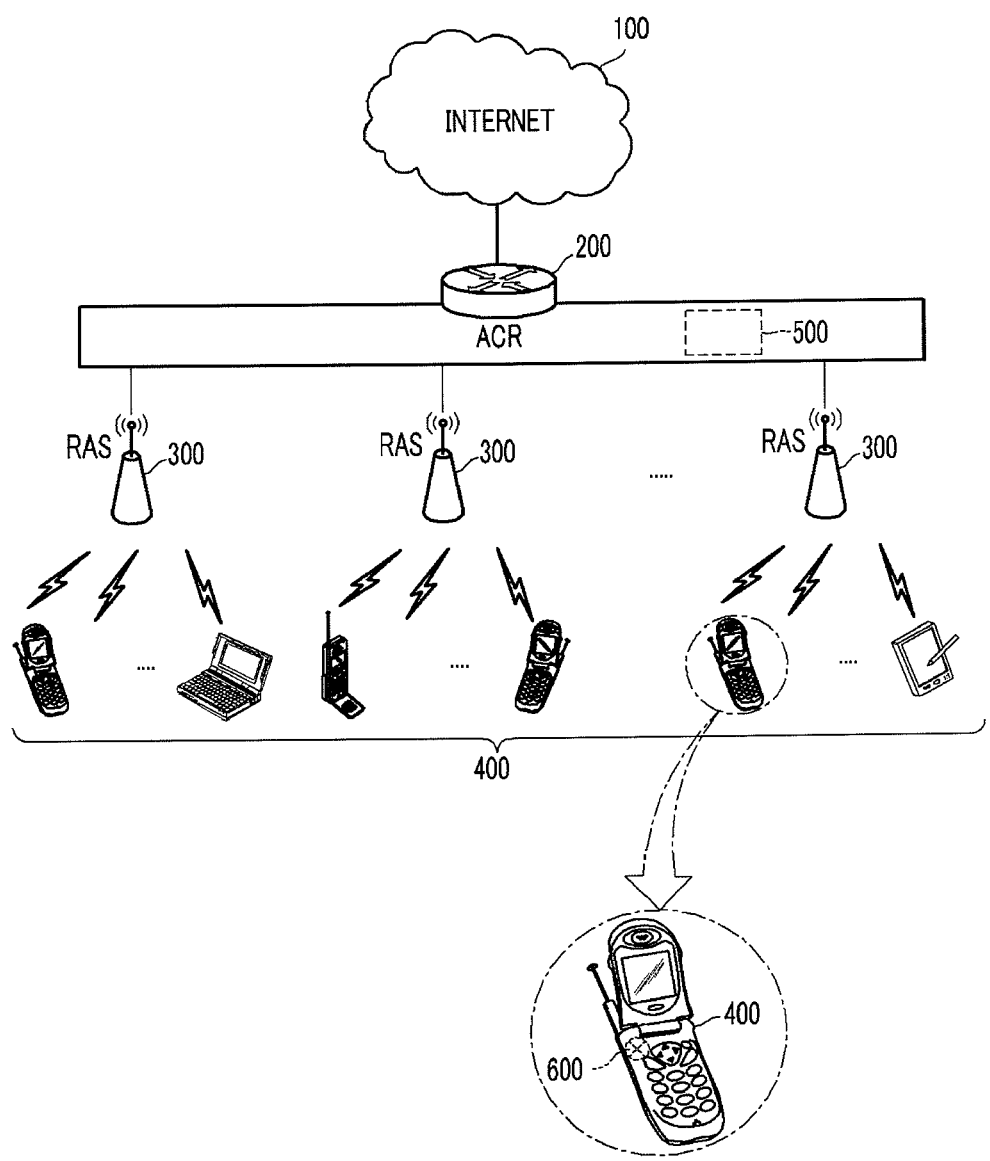
FIG. 1 is a view illustrating a configuration of a wireless mobile network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. In addition, for clarifying the present invention, portions that are not directly related to the description are omitted in the drawings. Like reference numerals designate like elements throughout the specification.

In the specification, it should be noted that a phrase that a portion "includes" an element means that the other element is not excluded but it can be further included therein if a particularly contrary phase is not disclosed. In addition, it should be noted that the terms "unit", "member", and "block" disclosed in the specification denote a unit for performing at least one function or operation, and it can be implemented as hardware, or a combination of hardware and software.

Hereinafter, an IPv6 address configuration method of a terminal in a wireless mobile network according to an exemplary embodiment of the present invention is described in detail with reference to the accompanying drawings.

According to the exemplary embodiment of the present invention, the terminal directly generates an IP address and performs an address allocation procedure based on a stateless address auto-configuration mechanism that is used after a server performs a duplicate address detection (DAD) procedure.

FIG. 1 is a view illustrating a configuration of the wireless mobile network according to the exemplary embodiment of the present invention.

Referring to FIG. 1, in a wireless network environment according to the exemplary embodiment of the present invention, a router 200 connected to the Internet 100 is connected to a plurality of base stations 300, and the base stations 300 are connected to a plurality of terminals 400.

In the wireless network environment according to the exemplary embodiment of the present invention, the router 200 and the terminals 400 include IPv6 address configuration apparatuses 500 and 600 respectively. The router address configuration apparatus 500 provided to the router 200 acquires information required for address configuration by using initial access messages that are provided from IEEE 802.16 MAC, which is an underlying structure of a WiBro service. The terminal address configuration apparatus 600 provided to the terminal 400 is provided with an agent for the address configuration so as to prevent messages of IPv6 from being transmitted in a wireless region.

Although the address configuration apparatus 500 is provided to the router 200, the address configuration apparatus 500 may be provided to the base station 300 or independently provided. However, for the convenience of description, in the exemplary embodiment of the present invention, the address configuration apparatus 500 provided to the router 200 is exemplified, and hereinafter is referred to as a router address configuration apparatus 500.

Figure 2:
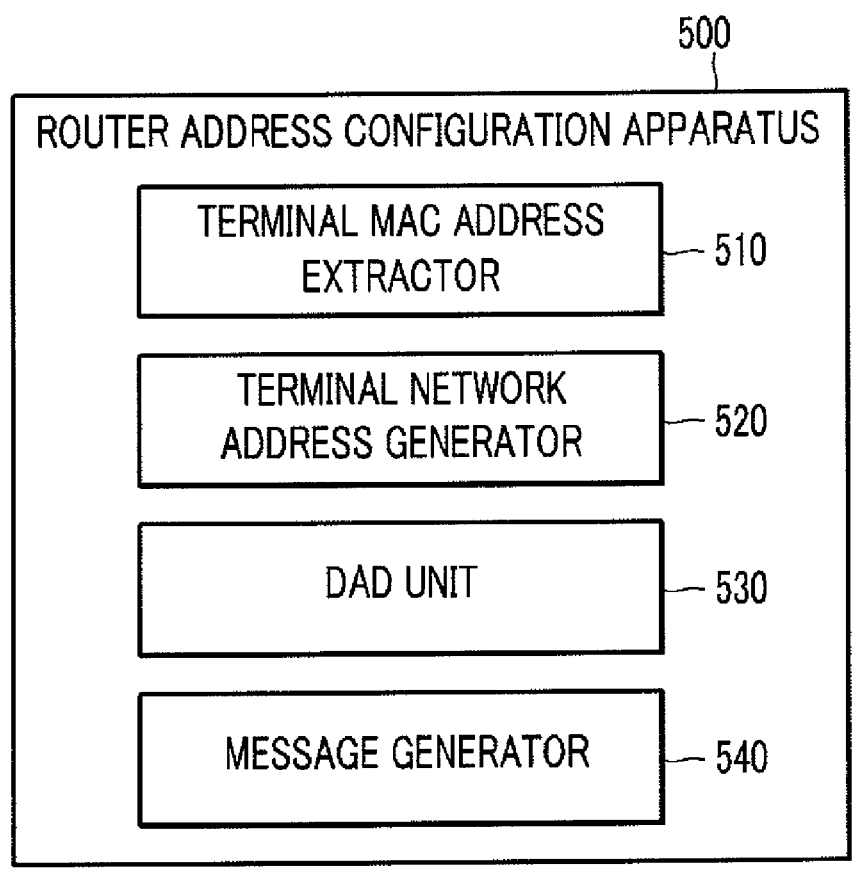
FIG. 2 is a block diagram illustrating an IPv6 address configuration apparatus of a router in a wireless mobile network according to an exemplary embodiment of the present invention.

FIG. 2 is a block diagram illustrating a router address configuration apparatus of a router in a wireless mobile network according to an exemplary embodiment of the present invention.

Referring to FIG. 2, the router address configuration apparatus 500 according to the exemplary embodiment of the present invention includes a terminal MAC address extractor 510, a terminal network address generator 520, a DAD unit 530, and a message generator 540.

The terminal MAC address extractor 510 receives messages in a MAC initial access procedure and analyzes the messages to extract a MAC address of the terminal 400.

The terminal network address generator 520 generates a 64-bit interface address (Interface ID) based on the MAC address of the terminal 400 extracted by the terminal MAC address extractor 510. Detailed schemes of generating the interface address are different according to types of interfaces. A general interface address is generated in accordance with the IEEE EUI-64 (Extended Unique Identifier-64) ID generating scheme.

The DAD unit 530 determines whether or not there is an address conflict in order to verify an address uniqueness of the interface address. The DAD unit 530 may be omitted if needed. Conventionally, the DAD procedure is performed through a series of procedures between the terminal 400 and the router 200 based on a network prefix provided by the router 200, so that conflict does not occur. However, in terms of a multilink environment, the DAD procedure may be selectively performed.

The message generator 540 attaches the 64-bit interface address of the verified terminal 400 and the 64-bit network prefix provided by the router to generate the Ipv6 address of the connected terminal 400 at the time of generating the provisioned DSA_REQ message. Namely, the Ipv6 address of the terminal 400 is attached to an optional field in a Primary DSA_REQ messaging procedure included in a messaging procedure of the WiBro service and transmitted to the terminal 400. The provisioned DSA_REQ message may be as shown in FIG. 3. In addition, the IP address of the router, a DAD result, and the network prefix are also attached.

Figure 4:
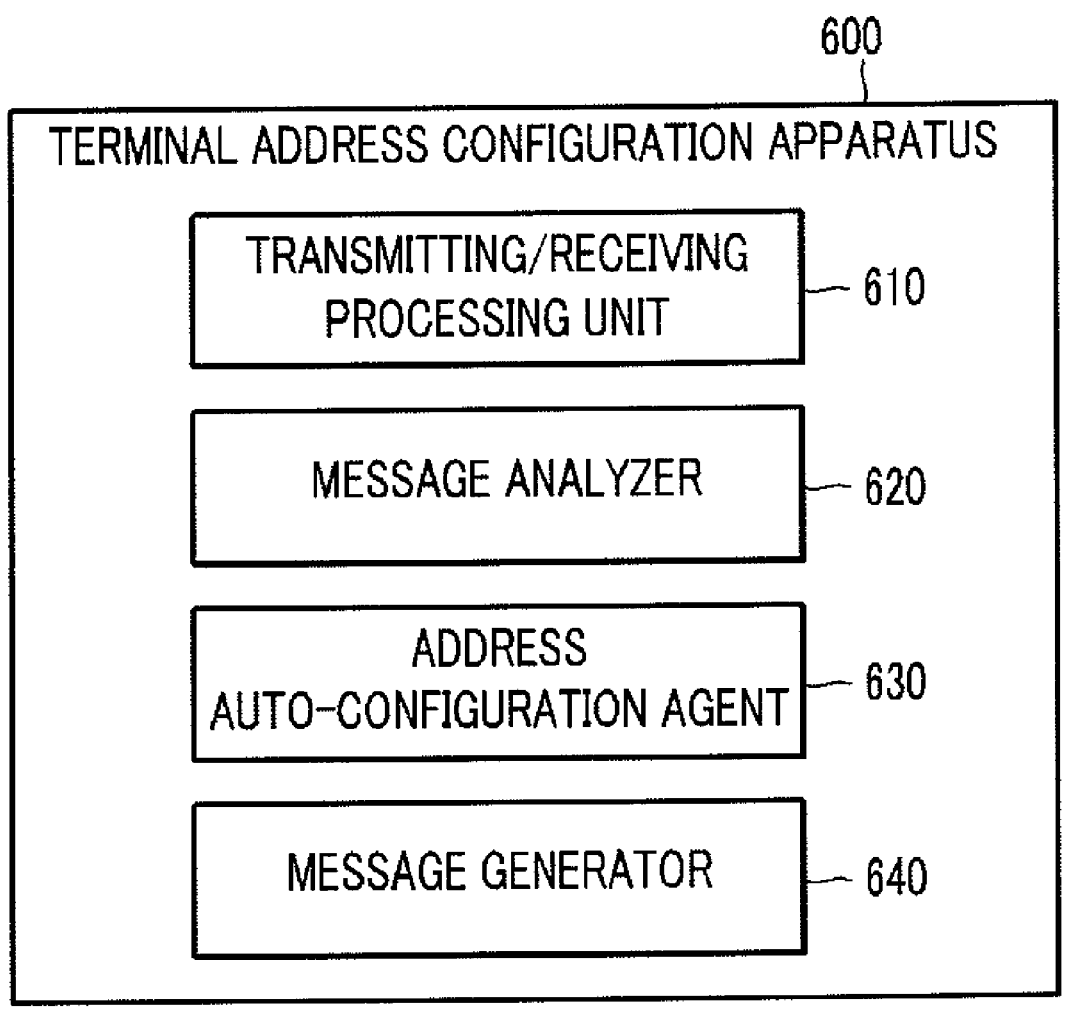
FIG. 4 is a block diagram illustrating an IPv6 address configuration apparatus of a terminal in a wireless mobile network according to an exemplary embodiment of the present invention.

FIG. 4 is a block diagram illustrating an IPv6 address configuration apparatus of a terminal in a wireless mobile network according to an exemplary embodiment of the present invention.

The terminal address configuration apparatus 600 provided to the terminal 400 includes a router transmitting/receiving processing unit 610, a message analyzer 620, an address auto-configuration agent 630, and a message generator 640.

The router transmitting/receiving processing unit 610 processes transmitting/receiving message addresses between the terminal 400 and the router 200 for the address auto-configuration.

The message analyzer 620 analyzes an initial access MAC management message and attaches a 48-bit MAC address to an internal field of a ranging request (RNG_REQ) message that is transmitted when the terminal 400 performs ranging. In addition, the message analyzer 620 analyzes the provisioned DSA_REQ message received from the router 200 to extract the terminal Ipv6 address, the router address, the DAD result, and the network prefix that are attached to the field.

The address auto-configuration agent 630 acquires the extracted terminal Ipv6 address to generate a response message required for a terminal Ipv6 address auto-configuration procedure, and transmits the response message to the Ipv6 protocol layer of the terminal 400. For example, a neighbor discovery (ND) response and information on the network interface prefix required in Ipv6 are configured to match with the message format based on values extracted from a MAC management message received from the router 200, and the ND response and the information on the network interface prefix are transmitted to the Ipv6 protocol layer.

The message generator 640 generates the provisioned dynamic service addition response (DSA_RSP) message which the terminal 400 completing the address auto-configuration procedure is to notify to the router 200.

In the exemplary embodiment of the present invention, the router address configuration apparatus 500 and the terminal address configuration apparatus 600 are configured in the aforementioned structures to perform the corresponding operations Among components required for the aforementioned address auto-configuration procedure, well-known components are not described in detail.

The IPv6 address configuration method according to the exemplary embodiment of the present invention is schematically described based on the aforementioned structures.

Figure 5:
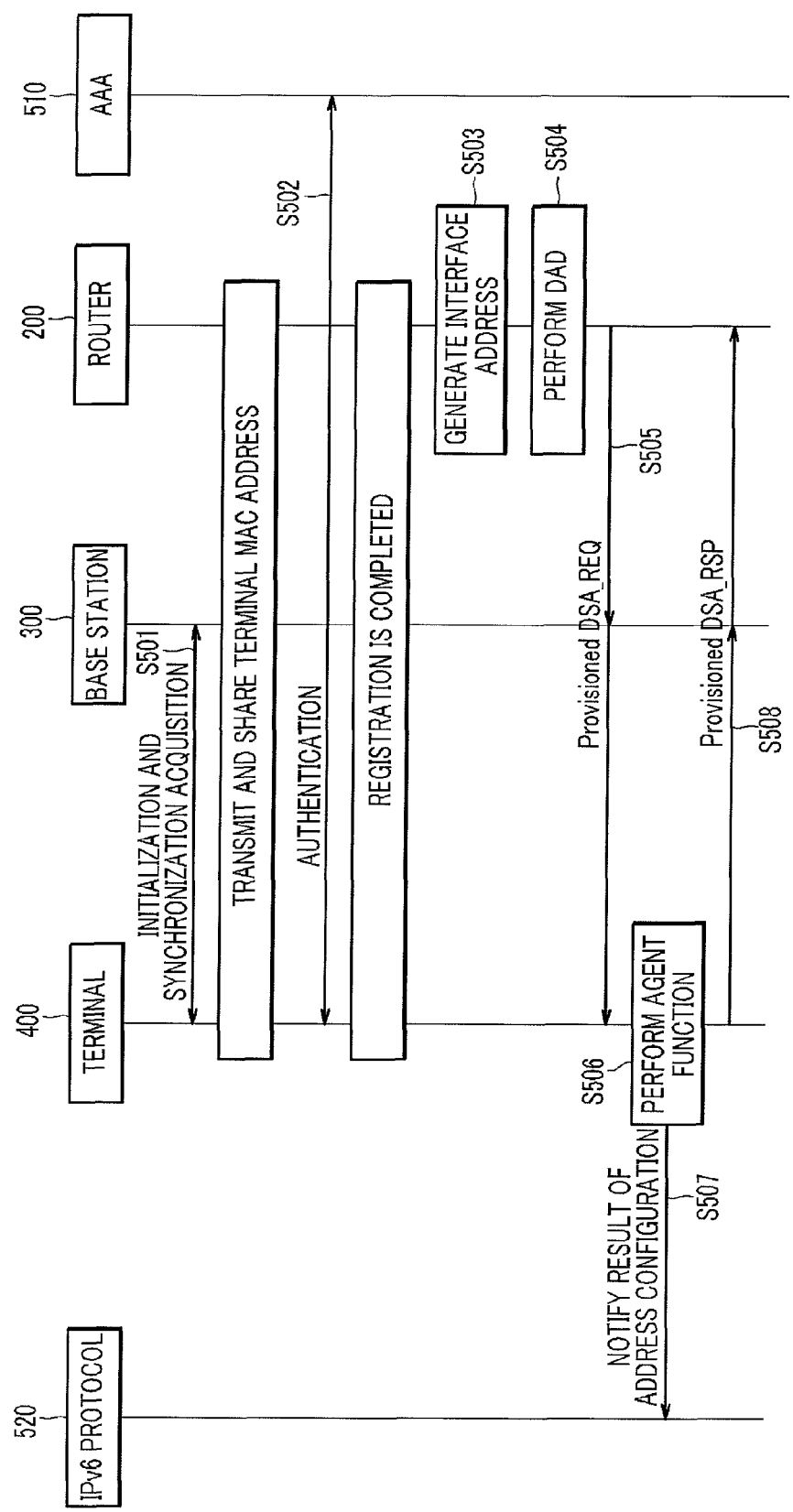
FIG. 5 is a flowchart illustrating an IPv6 address configuration method according to an exemplary embodiment of the present invention.

FIG. 5 is a flowchart illustrating an IPv6 address configuration method according to an exemplary embodiment of the present invention.

Referring to FIG. 5, initialization and synchronization acquisition procedures are performed, and during the procedures, the base station 300 or the router 200 acquires the MAC address of the terminal 400 (S501). The router 200 performs authentication on the terminal 400 with an authentication, authorization, and accounting (AAA) unit 510 to register the terminal 400 (S502). Next, the router 200 generates the Ipv6 terminal interface address based on the MAC address of the terminal 400 that is acquired in the aforementioned initial access procedure (S503). The router 200 directly performs the duplicate address detection (DAD) in a subnet in order to determine whether or not the generated Ipv6 terminal interface address is duplicated (S504). Next, in order to perform a basic WiBro access procedure, that is, the provisioned DSA procedure, the router 200 transmits a provisioned DSA_REQ message to the terminal 400 through the base station 300 (S505). At this time, available fields among the fields of the transmitted message are selected to transmit a 16-bit terminal Ipv6 address that is to be allocated to the terminal. Preferably, in the exemplary embodiment of the present invention, "convergence sublayer (CS) Parameter Encoding Rule ->Packet classification rule ->IP masked destination address field" is used, as shown in FIG. 3. The terminal 400 receives the provisioned DSA_REQ message from the router 200 (S506) and analyzes the received provisioned DSA_REQ message to acquire the terminal Ipv6 address. The address auto-configuration agent 630 of the terminal Ipv6 address configuration apparatus 600 generates a response message required for the terminal Ipv6 address auto-configuration procedure and transmits the response message to the Ipv6 protocol layer 520 of the terminal 400 (S507). The method of generating the response message in the agent 630 is described later. The terminal 400 transmits a provisioned DSA_RSP message as a response to success of acquisition of the terminal Ipv6 address to the router 200 through the base station 300 (S508).

Now, detailed procedures performed by the terminal 400 and the router 200 are described with reference to FIGS. 6 and 7.

Figure 6:
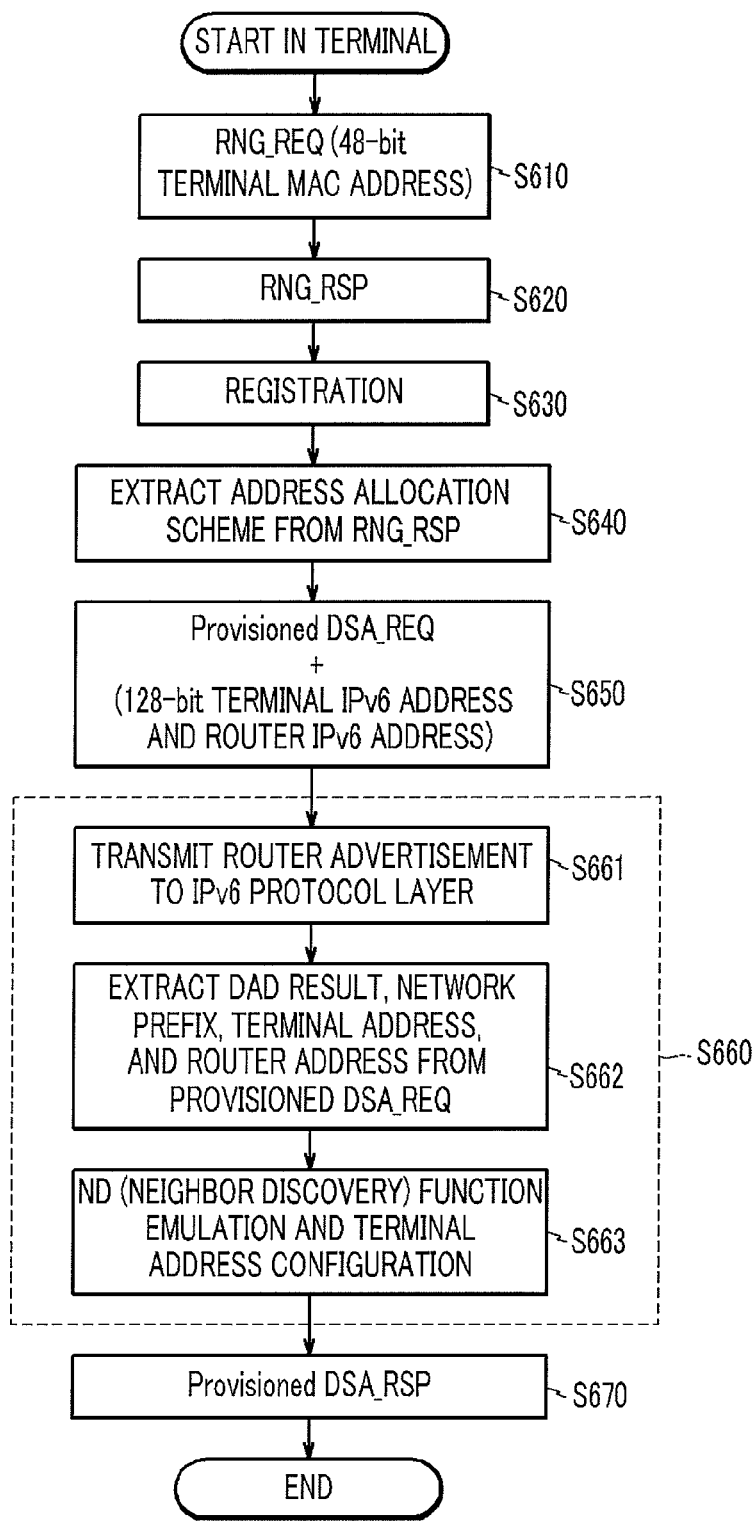
FIG. 6 is a flowchart illustrating an IPv6 address configuration method of a terminal according to an exemplary embodiment of the present invention.

FIG. 6 is a flowchart illustrating an IPv6 address configuration method of a terminal according to an exemplary embodiment of the present invention.

Referring to the configuration according to the exemplary embodiment of the present invention shown in FIG. 6, an RNG_REQ message is transmitted in order to perform initial ranging in the terminal 400. At this time, the 48-bit MAC address of the terminal 400 is included in an internal field (S610). Next, WiBro initialization procedures are performed (S620 and S630). The terminal 400 analyzes a field of a ranging response (RNG_RSP) message accepting registration received in a registration procedure to extract a to-be-used IP address allocation scheme (S640). Next, a provisioned DSA_REQ message is received from the router 200. A 128-bit terminal Ipv6 address of the terminal 400 and a router Ipv6 address of the router 200 are attached in an internal field of the received provisioned DSA_REQ message. If there is an effective value in the field, the duplicate address detection (DAD) is determined to succeed (S650). Next, the terminal address configuration apparatus 600 performs an Ipv6 message agent function as follows. The Ipv6 message agent function includes the below-described two procedures (S660). Firstly, router advertisement (RA) is transmitted to the Ipv6 protocol layer of the terminal 400. The RA is not received from the router 200, but the RA is generated from the terminal 400 by using the IP address allocation scheme extracted in the procedure S640 in which the RA is designed to seem to be received from the router 200 (S661). Next, the terminal Ipv6 address of the terminal 400, the router Ipv6 address of the router 200, the DAD result, and the network prefix are extracted from the provisioned DSA_REQ message received in the procedure S640 (S662). A neighbor discovery (ND) response and information on the network interface prefix required in Ipv6 are configured to match with the message format based on the terminal Ipv6 address of the terminal 400, the router Ipv6 address of the router 200, the DAD result, and the network prefix so that the ND response and the information on the network interface prefix are designed to seem to be received from the router 200, and the ND response and the information on the network interface prefix are transmitted to the Ipv6 protocol layer (S663).

Next, the resulting information is attached to an available field of the provisioned DSA_RSP message and transmitted to the router 200 (S670).

Figure 7:
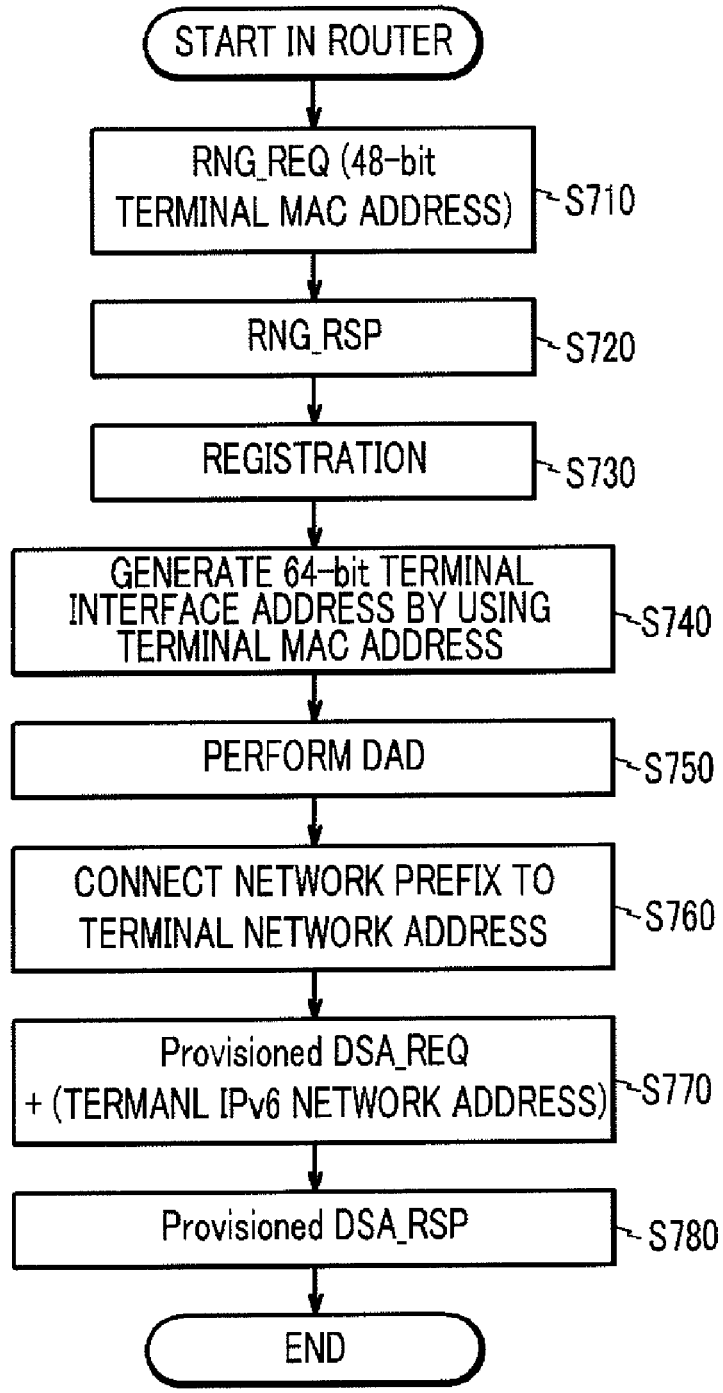
FIG. 7 is a flowchart illustrating an IPv6 address configuration method of a router according to an exemplary embodiment of the present invention.

FIG. 7 is a flowchart illustrating an IPv6 address configuration method of a router according to an exemplary embodiment of the present invention.

Referring to FIG. 7, an RNG_REQ message requesting for ranging is received from the terminal 400, and a 48-bit MAC address of the terminal 400 is acquired (S710). Next, a WiBro initialization procedure for the terminal 400 is performed (S720 and S730). Subsequently, a terminal interface address of the terminal 400 constituting the lower 64 bits of the IPv6 is generated by using the acquired MAC address of the terminal 400 (S740). Then, a DAD procedure is performed to verify uniqueness of the generated interface address (S750). The DAD procedure is a conventional procedure in which the router 200 determines whether or not the address of the terminal 400 is in a conflict in a subnet. The DAD procedure may be omitted according to a configuration of the network if needed. Next, a network prefix is added to generate a complete terminal IPv6 address of the terminal 400 (S760). The terminal IPv6 address of the terminal 400 that is generated and verified by the router 200 is attached to an available field of the provisioned DSA_REQ message and transmitted to the terminal 400 (S770). The provisioned DSA_RSP message including the resulting information of the IPv6 address configuration procedure is received from the terminal 400 (S780).

In the exemplary embodiment of the present invention, instead of the messaging procedure required for the terminal IPv6 address allocation of the terminal 400, attributes and available fields of the initial access messages of the MAC are used, so that the router 200 can perform a portion of the IPv6 address allocation function of the terminal 400. As a result, it is possible to efficiently implement the address configuration procedure.

More specifically, in an initial access ranging procedure between the terminal 400 and the base station 300, the MAC address of the terminal required for the IPv6 address allocation procedure is transmitted in advance, and the IPv6 address is transmitted by using the available field of the primary DSA_REQ/DSA_RSP messaging procedure for the wireless access. Since the available field of the WiBro MAC management message is used, re-definition or modification of a message format is not needed, so that uniformity of the format can be maintained.

In addition, an agent for address configuration is provided to the terminal address configuration apparatus 600 in order to prevent messages of the IPv6 from being transmitted in a wireless region, so that it is possible to reduce waste of resource in the wireless region and to simplify the access procedure.

Exemplary embodiments of the present invention can be implemented not only through the aforementioned method and/or apparatus but also through computer programs executing functions in association with the structures of the exemplary embodiments of the present invention or through a computer readable recording medium having embodied thereon the computer programs. The present invention can be easily implemented by those skilled in the art by using the above descriptions according to the exemplary embodiments.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

According to the present invention, initial access messages provided from a MAC are used to perform an IPv6 address configuration procedure. In addition, an agent for address configuration is provided to an address configuration apparatus of a terminal, so that it is possible to prevent messages of the IPv6 from being transmitted in a wireless region. In addition, a router acquires information required for address configuration by using a portion of fields of MAC management messages. Accordingly, it is possible to reduce the number of message exchanging procedures required for the initial access procedure and to reduce a time taken for access. As a result, it is possible to reduce consumption of wireless resource.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An address configuration method in which a router configures an Internet Protocol (IP) address of a terminal, the method comprising:

extracting a media access control (MAC) address from a field of a MAC management message requesting an initial registration received from the terminal;

generating an interface address of the terminal by using the MAC address;

generating the IP address of the terminal by attaching a network prefix of the router to the interface address of the terminal; and transmitting the generated IP address to the terminal in a field of another MAC management message, wherein the generated IP address is transmitted to the terminal prior to the terminal performing an auto-configuration of its IP address, and wherein the transmitted IP address is used by the terminal for performing auto-configuration of its IP address, and wherein the other MAC management message is a provisioned dynamic service addition request (DSA_REQ) message and the field of the other MAC management message in which the generated IP address is transmitted to the terminal is a convergence sublayer (CS) parameter encoding rule_packet classification rule_IP masked destination address field among fields of the provisioned DSA_REQ message.

2. The method of claim 1, wherein the generating of the interface address of the terminal comprises performing duplicate address detection (DAD) to verify uniqueness of the interface address of the terminal.

3. The method of claim 1, further comprising, after transmitting the generated IP address to the terminal, receiving a provisioned dynamic service addition response (DSA_RSP) message from the terminal.

4. An address configuration method in which a terminal configures an Internet Protocol (IP) address of the terminal, the method comprising:

transmitting a message to a router requesting initial registration, wherein the message includes a media access control (MAC) address of the terminal;

extracting information used for auto-configuration of the IP address of the terminal from at least one message received from the router, wherein the information is generated by the router based on the MAC address of the terminal;

performing auto-configuration of the IP address of the terminal by using the extracted information; and transmitting a resulting information message to the router, wherein the extracting of the information comprises:

analyzing a field of a message accepting the initial registration received from the router and extracting a to-be-used IP address allocation scheme there from; and extracting from a field of a provisioned dynamic service addition request (DSA_REQ) message received from the router the IP address of the terminal, an IP address of the router, a duplicate address detection (DAD) result, and a network prefix.

5. The method of claim 4, wherein the performing of the auto-configuration of the IP address of the terminal comprises:

generating a router advertisement (RA) by using the IP address allocation scheme identified in the message accepting the initial registration received from the router;

generating a neighbor discovery (ND) response and information on a network interface prefix used in IP version 6 (Ipv6) to match with a message format by using the IP address of the terminal, the IP address of the router, the DAD result, and the network prefix; and transmitting the generated RA, ND response, and information on the network interface prefix to an IP protocol layer of the terminal.

6. An Internet Protocol (IP) address configuration apparatus for a router, the apparatus comprising:

a terminal media access control (MAC) address extractor for extracting a MAC address of a terminal from a field of a MAC management message requesting an initial registration of the terminal;

a terminal network address generator for generating an interface address of the terminal based on the extracted MAC address of the terminal; and a message generator for generating another MAC management message including an IP address of the terminal that is configured based on the interface address of the terminal and a network prefix of the router, and for transmitting the other MAC management message to the terminal, wherein the other MAC management message including the IP address of the terminal is transmitted to the terminal prior to the terminal performing an auto-configuration of its IP address, and wherein the IP address of the terminal is used by the terminal for performing auto-configuration of its IP address, and wherein the other MAC management message is a provisioned dynamic service addition request (DSA_REQ) message and a field of the provisioned DSA_REQ message in which the IP address of the terminal is included is a convergence sublayer (CS) parameter encoding rule_packet classification rule_IP masked destination address field among fields of the provisioned DSA_REQ message.

7. The apparatus of claim 6, further comprising a duplicate address detection (DAD) unit for verifying uniqueness of the generated interface address of the terminal.

8. The apparatus of claim 7, wherein a result of the DAD is transmitted to the terminal using an available field of the provisioned DSA_REQ message.

9. The apparatus of claim 6, wherein the IP address of the terminal is generated by attaching the network prefix to the interface address of the terminal.

10. The apparatus of claim 6, wherein the message generator attaches the IP address of the terminal, an IP address of the router, a result of a duplicate address detection (DAD), and the network prefix to one or more available fields of the provisioned DSA_REQ message.

11. An Internet Protocol (IP) address configuration apparatus for a terminal, the apparatus comprising:

a transmitting/receiving processing unit for processing transmitting/receiving messages between the terminal and a router;

a message analyzer for attaching a media access control (MAC) address to a message requesting initial access that is transmitted to the router, and for extracting information used for auto-configuration of an IP address of the terminal from at least one message received from the router, wherein the information is generated by the router based on the MAC address of the terminal;

an address auto-configuration agent for acquiring the IP address of the terminal based on the extracted information; and a message generator for generating a message to notify the router that the terminal has completed auto-configuration of the IP address of the terminal, wherein the address auto-configuration agent analyzes a field of a message accepting the initial registration received from the router and extracts a to-be-used IP address allocation scheme there from, and extracts from a field of a provisioned dynamic service addition request (DSA_REQ) message received from the router the IP address of the terminal, an IP address of the router, a duplicate address detection (DAD) result, and a network prefix.

12. The apparatus of claim 11, wherein the address auto-configuration agent generates a router advertisement (RA) by using the IP address allocation scheme identified in the message accepting the initial registration received from the router, and transmits the RA to an IP protocol layer of the terminal.

13. The apparatus of claim 11, wherein the address auto-configuration agent generates a neighbor discovery (ND) response and information on a network interface prefix used in IP version 6 (Ipv6) to match with a message format based on the extracted information, and transmits the ND to an IP protocol layer of the terminal.

* * * * *